United States Patent
Langer

(10) Patent No.: US 7,500,121 B2
(45) Date of Patent: Mar. 3, 2009

(54) SYSTEM AND METHOD FOR OBTAINING CONFIGURATION INFORMATION BASED ON DETECTED PARAMETERS OF A REMOTE DEVICE

(75) Inventor: Tamir Langer, Givataim (IL)

(73) Assignee: Microsemi Corp. - Analog Mixed Signal Group Ltd., Hod Hasharon (IL)

( * ) Notice: Subject to any disclaimer, the term of this patent is extended or adjusted under 35 U.S.C. 154(b) by 583 days.

(21) Appl. No.: 11/261,706

(22) Filed: Oct. 31, 2005

(65) Prior Publication Data
US 2007/0064819 A1    Mar. 22, 2007

Related U.S. Application Data

(60) Provisional application No. 60/713,736, filed on Sep. 6, 2005.

(51) Int. Cl.
G06F 1/26    (2006.01)
(52) U.S. Cl. .................... 713/310; 713/300; 713/1; 375/257
(58) Field of Classification Search .............. 713/1, 713/300, 310; 375/257
See application file for complete search history.

(56) References Cited

U.S. PATENT DOCUMENTS

| | | | |
|---|---|---|---|
| 4,441,098 A * | 4/1984 | Borras et al. | ................. 341/20 |
| 5,146,172 A | 9/1992 | Mehr-Ayin et al. | |
| 5,506,490 A * | 4/1996 | DeMuro | ................. 320/106 |
| 5,646,609 A | 7/1997 | O'Brien | |
| 5,784,020 A | 7/1998 | Inoue | |
| 5,812,557 A | 9/1998 | Stewart et al. | |
| 6,255,973 B1 | 7/2001 | Smith et al. | |
| 6,473,608 B1 | 10/2002 | Lehr et al. | |
| 6,529,691 B2 * | 3/2003 | Guy et al. | ................. 399/12 |
| 6,643,566 B1 | 11/2003 | Lehr et al. | |
| 2003/0099076 A1 | 5/2003 | Elkayam et al. | |
| 2003/0122523 A1 | 7/2003 | Hyun-Jun et al. | |
| 2004/0268065 A1 * | 12/2004 | Hilton et al. | ................. 711/156 |
| 2005/0163152 A1 | 7/2005 | Binder | |

FOREIGN PATENT DOCUMENTS

WO  PCT/IL2005/001133   2/2006

OTHER PUBLICATIONS

IEEE 802.3af-2003 Standard—Jun. 18, 2003, IEEE, N.Y.

* cited by examiner

*Primary Examiner*—Thuan N Du
(74) *Attorney, Agent, or Firm*—Simon Kahn

(57) ABSTRACT

A system for remote identification comprising: a power sourcing device; a power ready patch panel comprising a first resistive element and at least one of a second resistive element, a multi-bit storage device and an open connection; a first electrical path between the power sourcing device and the first resistive element; and a second electrical path between the power sourcing device and the at least one of a second resistive element, a multi-bit storage device and an open connection; the power sourcing device being operable to obtain a value associated with the first resistive element via the first electrical path, and in the event the obtained value is indicative that a multi-bit storage device is connected to the second electrical path, obtain configuration information from the multi-bit storage device via the second electrical path.

29 Claims, 3 Drawing Sheets

SYSTEM AND METHOD FOR OBTAINING CONFIGURATION INFORMATION BASED ON DETECTED PARAMETERS OF A REMOTE DEVICE

CROSS-REFERENCE TO RELATED APPLICATIONS

This application claims priority from U.S. Provisional Patent Application Ser. No. 60/713,736 filed Sep. 6, 2005 entitled "Method for Detecting Parameters of a Remote Device" and is related to co-filed U.S. patent applications Ser. No. 11/261,705 pending filed Oct. 31, 2005 entitled "System for Providing Power Over Ethernet Through a Patch Panel"; Ser. No. 11/261,704 filed Oct. 31, 2005 entitled "Rack Level Power Management for Power Over Ethernet" issued as U.S. Pat. No. 7,441,133; and Ser. No. 11/261,706 filed Oct. 31, 2005 entitled "Rack Level Power Management" issued as U.S. Pat. No. 7,400,062. The entire contents of all of the above are incorporated herein by reference.

BACKGROUND OF THE INVENTION

The present invention relates to the field of detection of parameters of a remote device and more particularly to a method of determining the value of a resistive element in a remote device, and in response to the determined value either determining parameters based on one or more resistive values or determining parameters from a memory unit on the remote device.

The growth of local and wide area networks based on Ethernet technology has been an important driver for cabling offices and homes with structured cabling systems having multiple twisted wire pairs. The ubiquitous local area network, and the equipment which operates thereon, has led to a situation where there is often a need to attach a network operated device for which power is to be advantageously supplied by the network over the network wiring. Supplying power over the network wiring has many advantages including, but not limited to; reduced cost of installation; centralized power and power backup; and centralized security and management.

Several patents addressed to this issue exist including: U.S. Pat. No. 6,473,608 issued to Lehr et al., and U.S. Pat. No. 6,643,566 issued to Lehr et al., the entire contents of both of which are incorporated herein by reference. Furthermore a standard addressed to the issue of powering remote devices over an Ethernet based network, known as Power over Ethernet (PoE), has been published as IEEE 802.3af-2003, whose contents are incorporated herein by reference.

The above standard describes two alternative arrangements for powering from power sourcing equipment (PSE), denoted Alternative A and Alternative B. Alternative A is also known as data pair powering, in which power is supplied on wire pairs carrying data. Alternative B is also known as spare pair powering, in which power is supplied on wire pairs not used for carrying data. Since it is possible that two separate PSEs, one that implements Alternative A and one that implements Alternative B, may be attached to the same link segment a back off algorithm having different detection back off times for Alternative A and Alternative B are defined. Thus, in order to be in compliance, the PSE must be supplied with information indicating whether it is arranged according to Alternative A or Alternative B.

U.S. patent application Ser. No. 10/334,386 to Elkayam et al, published May 29, 2003 as US 2003/0099076 A1, whose entire contents are incorporated herein by reference, is addressed to an integral board and module for Power over LAN. Power over LAN has the same meaning throughout this application as PoE. The Power over LAN support circuitry which couples the approximately 48V DC current controlled power to the communication cabling via connectors is located on a board separate from the module comprising the power distribution and control circuitry. No means of automatically supplying the power distribution and control circuitry with information regarding Alternative A or Alternative B of the support circuitry is described.

What is therefore needed, and not known in the prior art, is a means for supplying configuration information from a remote site comprising support circuitry coupling power into communication cabling to power sourcing equipment.

SUMMARY OF THE INVENTION

Accordingly, it is a principal object of the present invention to overcome the disadvantages of prior art. This is provided in the present invention by enabling remote detection of a configuration. In an exemplary embodiment the remote device presents a resistive element having a resistive value selected from one of a set of values. The PSE detects and obtains its value, preferably by using a current source. In the event that the obtained value of the resistive element is of a particular pre-determined value, the PSE obtains further configuration information from a memory device in the remote device. In the event that the obtained value of the resistive element is of a value different than the particular pre-determined value, configuration information is decoded from the obtained value of the resistive element.

In one further embodiment, an additional one or more resistive element is presented by the remote device. The PSE utilizes the lines arranged for communication with the memory device to obtain the resistive values of the one or more resistive element thereby decoding additional configuration information.

The invention provides for an apparatus for remote configuration identification comprising: an apparatus for remote configuration identification comprising: a first electrical path for connection to a first resistive element; a second electrical path; a means for identifying a value of the first resistive element; and a control circuitry, the control circuitry being operative to: identify, via the means for identifying, a value associated with the first resistive element, and in the event the identified value is indicative that a multi-bit storage device is connected to the second electrical path, obtain configuration information from the multi-bit storage device.

In one embodiment the control circuitry is further operative to obtain configuration information from the identified value of the first resistive element. In another embodiment the control circuitry is further operative in the event the identified value is not indicative that a multi-bit storage device is connected to the second electrical path, to obtain configuration information from the identified value of the first resistive element.

In one embodiment the control circuitry is further operative in the event the identified value associated with the first resistive element is not indicative that a multi-bit storage device is connected to the second electrical path, to identify, via the means for identifying, a value associated with at least one second resistive element connected to the second electrical path. In one further embodiment the control circuitry is further operative to obtain configuration information from the identified value associated with the at least one second resistive element.

In one embodiment the means for identifying comprises at least one of a current source, an analog multiplexer and an analog to digital converter. In another embodiment the configuration information comprises information regarding arrangement according to at least one of data pair powering, spare pair powering and a combination of data pair powering and spare pair powering.

In one embodiment the configuration information comprises information regarding a type of display. In another embodiment configuration information comprises vendor specific configuration information. Preferably, vendor specific configuration information comprises one of a preferred method of reducing power in the event of a failure of one or more components of a power source, a priority of powering, a size of the apparatus, and an identification of a master port of the apparatus. In one embodiment the apparatus is a power sourcing device for use with a power ready patch panel.

Independently the invention provides for a method of remote identification comprising: providing a first electrical path for connection to a first resistive element; providing a second electrical path; identifying a value associated with the first resistive element; and in the event the identified value is indicative that a multi-bit storage device is connected to the second electrical path, obtaining configuration information from the multi-bit storage device.

In one embodiment the method further comprises obtaining configuration information from the identified value of the first resistive element. In another embodiment the method further comprises in the event the identified value is not indicative that a multi-bit storage device is connected to the second electrical path, obtaining configuration information from the identified value of the first resistive element. In one further embodiment the method further comprises in the event the identified value associated with the first resistive element is not indicative that a multi-bit storage device is connected to the second electrical path, identifying a value associated with at least one second resistive element connected to the provided second electrical path. Preferably the method further comprises obtaining configuration information from the identified value associated with the at least one second resistive element.

In one embodiment the method further comprises in the event the identified value is not indicative that a multi-bit storage device is connected to the second electrical path, identifying a value associated with at least one second resistive element connected to the second electrical path, and obtaining first configuration information from the identified value associated with at least one second resistive element. In one embodiment the configuration information comprises information regarding arrangement according to at least one of data pair powering, spare pair powering and a combination of data pair powering and spare pair powering.

In one embodiment the configuration information comprises information regarding a type of display. In another embodiment the configuration information comprises vendor specific configuration information. In one further embodiment the vendor specific configuration information includes one of a preferred method of reducing power in the event of a failure of one or more components of a power source, a priority of powering, a size, and an identification of a master port.

Independently the invention provides for a system for remote identification comprising: a power sourcing device; a power ready patch panel comprising a first resistive element and at least one of a second resistive element, a multi-bit storage device and an open connection; a first electrical path between the power sourcing device and the first resistive element; and a second electrical path between the power sourcing device and the at least one of a second resistive element, a multi-bit storage device and an open connection; the power sourcing device being operable to obtain a value associated with the first resistive element via the first electrical path, and in the event the obtained value is indicative that a multi-bit storage device is connected to the second electrical path, obtain configuration information from the multi-bit storage device via the second electrical path.

In one embodiment the power sourcing device is further operable in the event the obtained value is not indicative that a multi-bit storage device is connected to the second electrical path, to obtain configuration information from at least one of the first resistive element via the first electrical path, the at least one second resistive element via the second electrical path and the open connection via the second electrical path. In another embodiment the system further comprises a third electrical path between the power sourcing device and the power ready patch panel, wherein the power sourcing device is further operable responsive to the obtained configuration information to supply a current limited power to the power ready patch panel via the third electrical path.

In one embodiment the system further comprises a third electrical path between the power sourcing device and the power ready patch panel and wherein the power ready patch panel further comprises a display, the power sourcing device being further operable to send compatible information via the third electrical path to the display responsive to the obtained configuration information. In another embodiment the system further comprises a third electrical path between the power sourcing device and the power ready patch panel and wherein the power ready patch panel further comprises a display, the power sourcing device being further operable to drive the display via the third electrical path responsive to the obtained configuration information.

In one embodiment the configuration information comprises information regarding arrangement according to at least one of data pair powering, spare pair powering and a combination of data pair powering and spare pair powering. In another embodiment the configuration information comprises vendor specific configuration information. In one further embodiment the vendor specific configuration information comprises one of a preferred method of reducing power in the event of a failure of one or more components of a power source, a priority of powering, a size of the power ready patch panel, and an identification of a master port of the power ready patch panel.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF PREFERRED EMBODIMENTS

Figure 1:
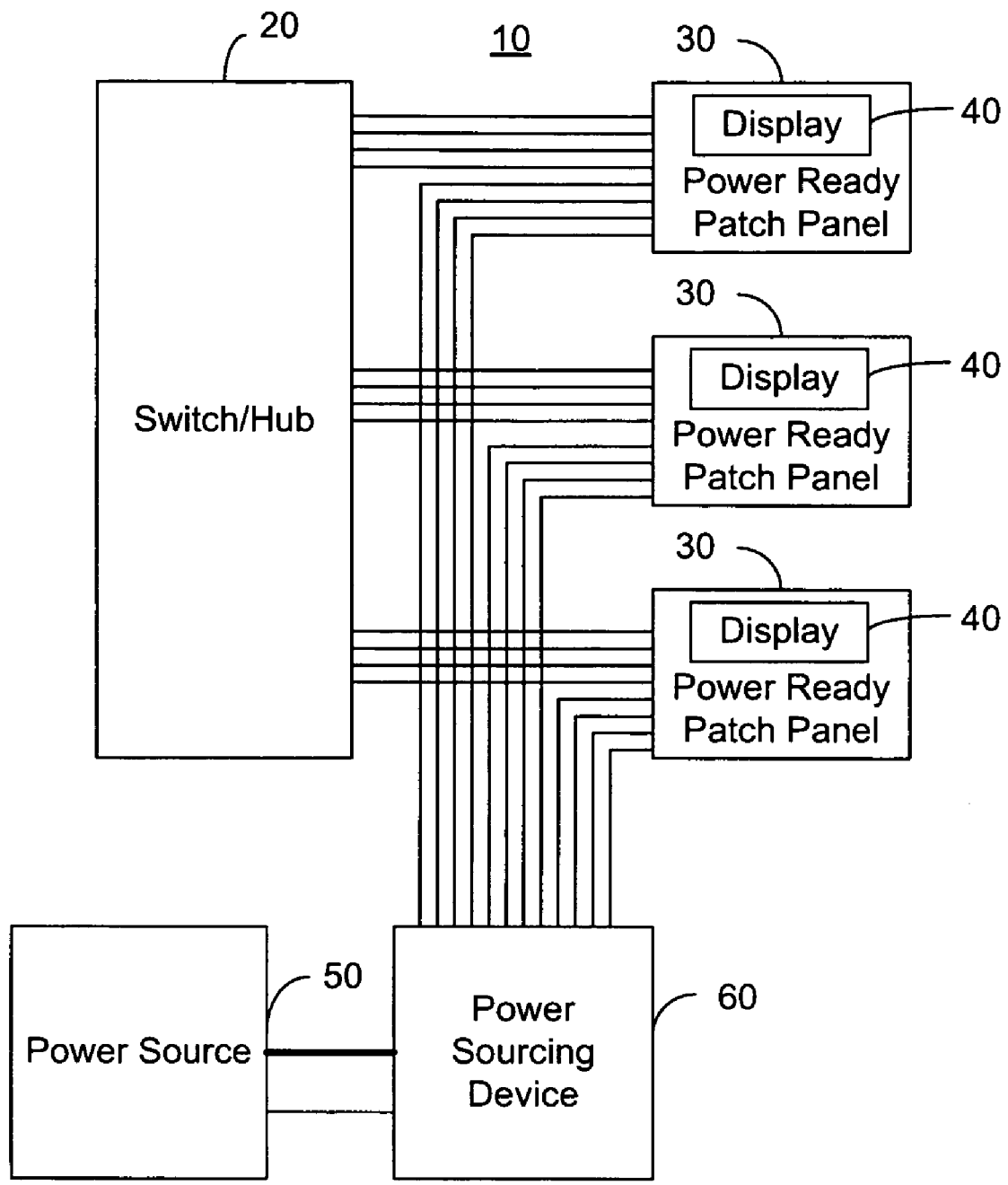
FIG. 1 is a high level block diagram of a system of a centralized PSE supplying current limited power for connection to powered devices via a plurality of power ready patch panels in accordance with the principle of the current invention.

The present embodiments enable detection of parameters of a remote device. The remote device presents a resistive element having a resistive value selected from one of a set of values. The PSE detects and obtains its value, preferably by using a current source. In the event that the obtained value of the resistive element is of a particular pre-determined value, the PSE obtains further configuration information from a memory device in the remote device. In the event that the obtained value of the resistive element is of a value different than the particular pre-determined value, configuration information is decoded from the obtained value of the resistive element.

In one further embodiment, an additional one or more resistive element is presented by the remote device. The PSE utilizes the lines arranged for communication with the memory device to obtain the resistive values of the one or more resistive element thereby decoding additional configuration information.

The invention is herein being described in relation to a power over Ethernet system, in which the remote device is a power ready patch panel as described in co-filed U.S. patent application entitled "System for Providing Power Over Ethernet Through a Patch Panel" identified by docket number PDS-023-US the entire contents of which is incorporated herein by reference. The power ready patch panel functions as support circuitry for a power sourcing device which supplies current controlled power for each port to be powered. However this is only by way of illustration and is not meant to be limiting in any way.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 is a high level block diagram of a system 10 of a centralized PSE supplying current limited power for connection to powered devices via a plurality of power ready patch panels in accordance with the principle of the invention. System 10 comprises a switch/hub 20, a plurality of power ready patch panels 30 each comprising a display 40, a power sourcing device 60 and a power source 50. Power source 50 is arranged to supply power to power sourcing device 60, and preferably is also arranged to supply data to power sourcing device 60 regarding the status of power source 50. Power sourcing device 60 is connected by a plurality of connections to each power ready patch panel 30, each of the plurality of connections carrying current limited power, status and display information as will be described further hereinto below. In a preferred embodiment, each of the plurality of connections comprise a power and return lead for each port of power ready patch panel 30 for which power is supplied and an LED indicator lead for use in display 40. For ease of wiring a plurality of ports are supplied with their connections cabled together in a single cable terminated in a connector block. Preferably, the connector block is detachable connected. For each single cable, additional connections required for detecting configuration information is further provided, as will be described further hereinto below. A plurality of cables may be utilized for a single power ready patch panel 30, each cable providing power, display information and configuration information associated with a portion of a large power ready patch panel 30. In an exemplary embodiment, 12 ports of a power ready patch panel are supported on a single cable. Preferably the power ready patch panel supports one of 24 and 48 ports.

Switch/hub 20 is connected by a plurality of connections to each power ready patch panel 30, with a separate connection being made for each port of power ready patch panel 30 for which data communication is to be supplied.

In operation power sourcing device 60 supplies PoE compatible power for connection at power ready patch panel 30 to each port to be powered, with data being supported by switch/hub 20. Power ready patch panel 30 connects the power supplied from power sourcing device 60 to the connected communication cabling (not shown). As described above, power may be supplied according to Alternative A, i.e. to the data pairs or according to Alternative B, i.e. to the spare pairs. Additionally, power may be supplied to both the data and spare pairs as described for example in U.S. patent application Ser. No. 10/761,327 to Peker, published as US 2005/0085212 A1, the entire contents of which is incorporated herein by reference and U.S. patent application Ser. No. 11/036,063 to Peker, published as US 2005/0122140 A1 the entire contents of which is incorporated herein by reference. In such an embodiment both data pair powering and spare pair powering are supported.

Preferably, power sourcing device 60 supplies display information for display 40 of power ready patch panel 30. In an exemplary embodiment display 40 comprises an LED for each port, and power sourcing device 60 drives display 40 by supplying controlled power to light an LED of display 40 for each port being powered. Display 40 may comprise single color LEDs or bi-color LEDs, and preferably the type of LED supplied is provided as a portion of the configuration information to be detected from power ready patch panel 30. Power sourcing device 60 is operational to detect configuration information of power ready patch panel 30 as will be explained further hereinto below.

Figure 2:
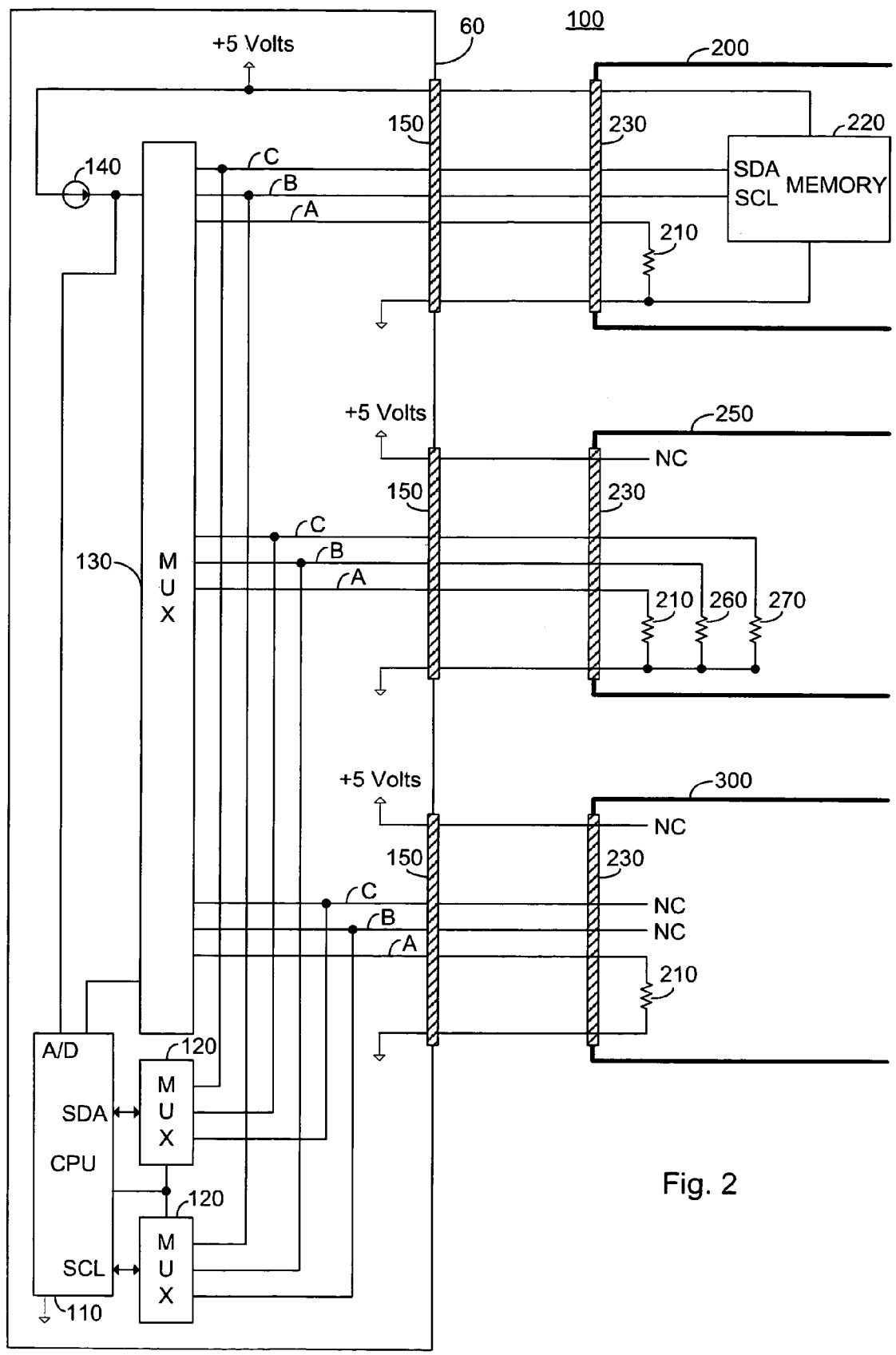
FIG. 2 is a high level schematic diagram of an electrical implementation of a portion of the system of FIG. 1 in accordance with the principle of the current invention.

FIG. 2 is a high level schematic diagram of an electrical implementation 100 of a portion of system 10 of FIG. 1, and in particular the portion of system 10 comprising power ready patch panel 30 presenting its configuration information in accordance with the principle of the current invention, and the portion of power sourcing device 60 operational to detect the presented configuration information. Implementation 100 comprises: power sourcing device 60 comprising a CPU 110, a first and second analog multiplexer 120, an analog multiplexer 130, a current source 140 and a plurality of connectors 150; a power ready patch panel 200 comprising configuration resistance 210, a multi-bit storage device 220 and connector 230; a power ready patch panel 250 comprising configuration resistance 210, first additional configuration resistance 260, second additional configuration resistance 270 and connector 230; and a power ready patch panel 300 comprising configuration resistance 210 and connector 230. Multi-bit storage device 220 may comprise a ROM, an EEPROM or a multi-character identification device without exceeding the scope of the invention. For clarity, multi-bit storage device 220 is herein described as memory device 220, however this is not meant to be limiting in any way.

A voltage reference comprised within power sourcing device 60, depicted as a 5 volt voltage reference, is connected via connector 150 to each of power ready patch panels 200, 250 and 300 via respective connector 230. Analog multiplexer 130 is connected with 3 connections via respective connectors 150 to each of power ready patch panel 200, 250 and 300 via respective connectors 230. The three connections are denoted herein A, B and C for clarity. First analog multiplexer 120 is connected to a connection B associated with each of power ready patch panel 200, 250 and 300. Second analog multiplexer 120 is connected to a connection C associated with each of power ready patch panel 200, 250 and 300. Each of first and second analog multiplexer 120 is connected bi-directionally to CPU 110. A first end of current source 140 is connected to the voltage reference and a second end of current source 140 is connected to a port of analog multiplexer 130. An additional port of analog multiplexer 130 is connected to an A/D input of CPU 110. In an exemplary embodiment current source 140 supplies 4 mA.

Power ready patch panel 200 exhibits configuration resistance 210 whose first end is connected via connectors 230, 150 to a respective connection A of analog multiplexer 130. A second end of configuration resistance 210 is connected via connectors 230, 150 to a common ground. Memory device 220 is connected to the 5 volt voltage reference via connectors 230, 150 and a second end of configuration resistance 210 as a ground connection. The SDA port, also known as the serial data port, is connected via connector 230 and a respective connector 150 to connection C of analog multiplexer 130. The SCL port, also known as the serial clock port, is connected via connector 230 and a respective connector 150 to connection B of analog multiplexer 130.

Power ready patch panel 250 exhibits configuration resistance 210 whose first end is connected via connectors 230, 150 to a respective connection A of analog multiplexer 130. A second end of configuration resistance 210 is connected via connectors 230, 150 to a common ground. A first end of first additional configuration resistance 260 is connected via connector 230 and a respective connector 150 to a respective connection B of analog multiplexer 130. A second end of first additional configuration resistance 260 is connected to the second end of configuration resistance 210 as a ground connection. A first end of second additional configuration resistance 270 is connected via connector 230 and a respective connector 150 to a respective connection C of analog multiplexer 130. A second end of second additional configuration resistance 270 is connected to the second end of configuration resistance 210 as a ground connection.

Power ready patch panel 300 exhibits configuration resistance 210 whose first end is connected via connectors 230, 150 to a respective connection A of analog multiplexer 130. A second end of configuration resistance 210 is connected via connectors 230, 150 to a common ground.

CPU 110 is in an exemplary embodiment a microcontroller or microcomputer however this is not meant to be limiting in any way. CPU 110 may be replaced with an ASIC or dedicated control circuit without exceeding the scope of the invention. Memory device 220 is depicted as an I²C compatible device, requiring only two lines for serial communication however this is not meant to be limiting in any way. A serial memory device is however preferred to minimize the number of lines required.

In operation, CPU 110 operates analog multiplexer 130 to connect configuration resistance 210 of each of power ready patch panel 200, 250 and 300 in turn to current source 140. CPU 110 further operates its A/D input to measure the voltage drop resulting from the operation of current source 140 thereby determining the resistance value of the respective configuration resistance 210. In the event that the determined configuration resistance 210 value is indicative of the existence of a memory device 220, such as in the configuration of power ready patch panel 200, CPU 110 operates first and second analog multiplexers 120 to read memory device 220 via its SDA and SCL outputs. Advantageously, no specific address need be assigned to memory device 220.

In the event that the determined configuration resistance 210 value is not indicative of the existence of a memory device 220, such as in the configuration of power ready patch panel 250, CPU 110 operates analog multiplexer 130 to connect first additional configuration resistance 260 to current source 140 and the A/D input of CPU 110. CPU 110 then determines the resistance value of first additional configuration resistance 260. CPU 110 then operates analog multiplexer 130 to connect second additional configuration resistance 270 to current source 140 and the A/D input of CPU 110. CPU 110 then determines the resistance value of second additional configuration resistance.

In the event that powered patch panel device 300 is connected, CPU 110 will detect a no connection for each of first and second additional configuration resistances. Such a configuration reduces cost, with a disadvantage of a reduced number of possible configurations.

In an alternative embodiment (not shown), the existence of first and/or second additional configuration resistance 260, 270 is further decoded based on the obtained value of configuration resistance 210. Thus, a pre-determined value of configuration resistance 210 may be used to indicate that additional configuration resistances are to be read. In the absence of such a pre-determined value, thereby indicating a configuration such as that of power ready patch panel 300, the steps of obtaining a value for first additional configuration resistance 260 and/or second additional configuration resistance 270 may be waived.

In one embodiment 16 different values may be detected for configuration resistance 210. A chart of some detected configuration resistance 210 values, measured voltage at A/D input of CPU 110, digital representation and meaning is presented in Table I below.

TABLE I

| Nominal Configuration Resistance | Nominal Measured Voltage | Digital Representation | Meaning |
|---|---|---|---|
| 0 (short circuit) | 0 V | 0000 | No configuration information, Spare Pair Powering, Single Color LED |
| 50 ohm | 200 mV | 0001 | Spare Pair Powering Bi-color LED |
| 100 ohm | 400 mV | 0010 | Data Pair Powering; Single Color LED |
| 150 ohm | 600 mV | 0011 | Data Pair Powering; Bi-color LED |

TABLE I-continued

| Nominal Configuration Resistance | Nominal Measured Voltage | Digital Representation | Meaning |
|---|---|---|---|
| 200 ohm | 800 mV | 0100 | Data Pair Powering and Spare Pair Powering supported; single color LED |
| 250 ohm | 1 V | 0101 | Alternatives A and B supported; Bi-color LED |
| 300 ohm | 1.2 V | 0110 | |
| 350 ohm | 1.4 V | 0111 | |
| 400 ohm | 1.6 V | 1000 | |
| 450 ohm | 1.8 V | 1001 | |
| 500 ohm | 2.0 V | 1010 | |
| 550 ohm | 2.2 V | 1011 | |
| 600 ohm | 2.4 V | 1100 | |
| 650 ohm | 2.6 V | 1101 | Serial Memory Device Installed |
| 700 ohm | 2.8 V | 1110 | Serial Memory Device Installed |
| Open | 3.0 V | 1111 | No Connection |

In the event that values are detected for first and second additional configuration resistances 260, 270 information regarding port locations on power ready patch panel 30, size of patch panel and other features may be detected. Information may also comprise an indication that power is not connected and information may also comprise personalization information indicative of vendor specific features to be supported by power sourcing device 60 in cooperation with power ready patch panel 30. In one embodiment, vendor specific features include a preferred method of reducing power in the event of a failure of one or more components of power source 50. Thus, specific advanced software features supported by power sourcing device 60 are enabled or disabled in response to the type of operation obtained from the configuration information of the remote device.

The above has been described in relation to a single power ready patch panel 30 having a common configuration for all ports, however this is not meant to be limiting in any way. Configuration is accomplished herein per connector, and thus multiple connectors on a single power ready patch panel may each provide different configuration information. Furthermore, in the event of additional configuration resistive elements 260, 270, or a memory device 220, separate configurations for each port may be supplied without exceeding the scope of the invention.

Figure 3:
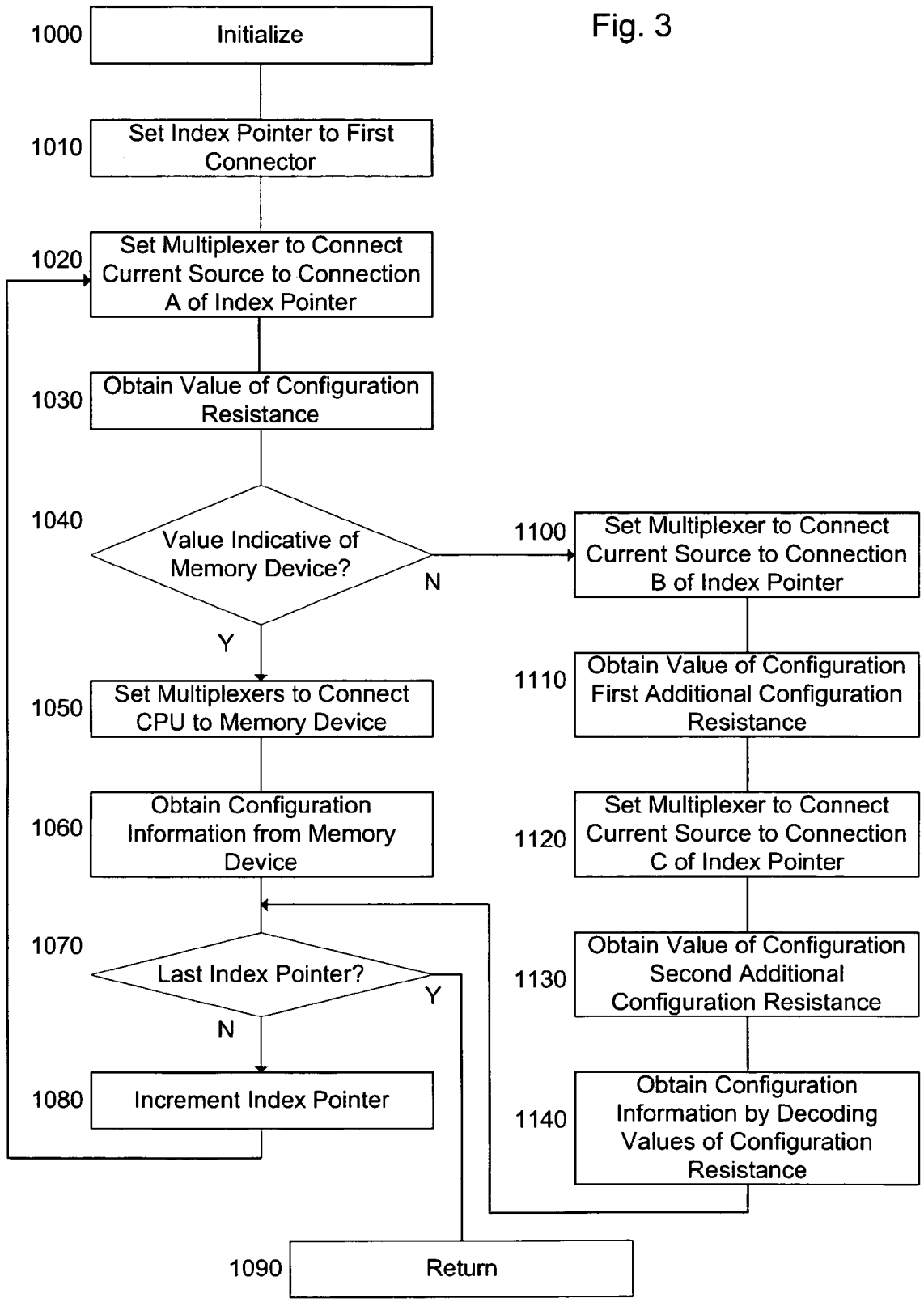
FIG. 3 is a high flow chart of the operation of the CPU of FIG. 2 to identify the configuration of each power ready patch panel in accordance with the principle of the current invention.

FIG. 3 is a high flow chart of the operation of CPU 110 of FIG. 2 to identify the configuration of each of patch panel 200, 250 and 300. It is to be understood that patch panels 200, 250 and 300 may be sections of a single patch large patch panel without exceeding the scope of the invention.

In stage 1000, CPU 110 is initialized. The stage of initialization preferably comprises enabling current source 140, and inputting the total number of connectors 150 via which configuration information is to be obtained. Configuration information is obtained for each connector 150, irrespective of the physical power ready patch panel 30 to which connector 150 is connected. Thus, a large power ready patch panel, such as one supporting in excess of 12 ports, may be connected to a plurality of connectors 150. Initialization further comprises inputting a series of ranges of resistance values, their expected measured voltages and their associated digital representations. Thus, a set of initial resistance values, their expected measured voltages, tolerances for obtained values, an associated digital representation and an associated meaning is input for each resistance value.

In stage 1010 an index pointer is set to a first connector 150. In stage 1020 analog multiplexer 130 is set to connect current source 140 to connection A of the connector 150 indicated by the index pointer. In stage 1030 the value of connected configuration resistance 210 is obtained, preferably via the A/D converter of CPU 110.

In stage 1040 the value of connected configuration resistance 210 obtained in stage 1030 is compared to a pre-determined value indicative of the existence of a memory device 220. In the event that value obtained in stage 1030 is indicative of the existence of memory device 220, in stage 1050 first and second analog multiplexers 120 are set to enable serial communication between CPU 100 and memory device 220. In an exemplary embodiment only two serial lines are required; first multiplexer 120 connects line B to a serial clock port of CPU 110 and second multiplexer 120 connects line C to a serial data port of CPU 110. In stage 1060 CPU 110 obtains complete configuration information from memory device 220.

In stage 1070 the pointer is checked to determine if configuration information has been obtained from the last connector 150. In the event that configuration information has not been obtained from the last connector 150, in stage 1080 the index pointer is incremented and then stage 1020 as described above is implemented.

In the event that in stage 1070 configuration information has been obtained from the last connector 150, in stage 1090 the routine returns.

In the event that the value obtained in stage 1030 is not indicative of the existence of memory device 220, in stage 1100 analog multiplexer 130 is set to connect current source 140 to connection B of connector 150 indicated by the index pointer. In stage 1110 the value of connected first additional configuration resistance 260 is obtained, preferably via the A/D converter of CPU 110. It is to be understood that in the event no first additional configuration resistance is connected, as shown in power ready patch panel 300, the value obtained will be indicative of an open connection. In an alternative embodiment (not shown), a specific value for configuration resistance 210 is indicative that no additional configuration resistances are connected. In such an alternative embodiment stages 1100-1140 are not required.

In stage 1120 analog multiplexer 130 is set to connect current source 140 to connection C of connector 150 indicated by the index pointer. In stage 1130 the value of connected second additional configuration resistance 270 is obtained, preferably via the A/D converter of CPU 110. It is to be understood that in the event no second additional configuration resistance is connected, as shown in power ready patch panel 300, the value obtained will be indicative of an open connection.

In stage 1140 full configuration information is decoded from the value of the configuration resistance 210 obtained in stage 1030, the value of first additional configuration resistance 260 obtained in stage 1110 and the value of second additional configuration resistance 270 obtained in stage 1130. The index pointer is then incremented in accordance with stage 1080 as described above.

The above has been described as having remote devices with a memory device for configuration information or connections for a plurality of resistive elements, however this is not meant to be limiting in any way. In particular a remote device with a memory device for configuration information or a single resistive element for configuration information is specifically included within the scope of the invention.

Additional configuration information may comprise one or more of: the total number of ports in the power ready patch panel; the position of the connector in relation to the total number of ports, e.g. the connector is a second one of 4 connectors of power ready patch panel 30; an identification of the master or a pre-selected port on the power ready patch panel, e.g. port 1 of the power ready patch panel; an identification of the manufacturer; and serial number or part number information. In the event that serial number of part number information is supplied, such information may affect the operation of power sourcing device 60. In particular, power sourcing device 60 may be set to power ports in accordance with priority, the priority being input based on the information downloaded from memory device 220 or decoded from configuration resistance 210 and/or first and second additional configuration resistance 260, 270. Thus, the powering operation of power sourcing device 60 may be a function of downloaded configuration information. In another embodiment, vendor specific features including a preferred method of reducing power in the event of a failure of one or more components of power source 50 is obtained from additional configuration information. Thus, specific advanced software features supported by power sourcing device 60 are enabled or disabled in response to the type of operation obtained from the configuration information of the remote device.

In yet another embodiment, memory device 220 may be field programmable with further connection or priority information. Thus, the operation of power sourcing device 60 may be controlled by information loaded into serial memory device 220 during installation of power ready patch panel 30 even though power sourcing device 60 may be installed at a later date.

The above has been described as having only two types of display, a single color or bi-color LED. This is not meant to be limiting in any way and is particularly meant to include other types of displays such as a liquid crystal display (LCD) or other direct information display.

The present embodiments thus enable detection of parameters of a remote device. The remote device presents a resistive element having a resistive value selected from one of a set of values. The PSE detects and obtains its value, preferably by using a current source. In the event that the obtained value of the resistive element is of a particular pre-determined value, the PSE obtains further configuration information from a memory device in the remote device. In the event that the obtained value of the resistive element is of a value different than the particular pre-determined value, configuration information is decoded from the obtained value of the resistive element.

In one further embodiment, an additional one or more resistive element is presented by the remote device. The PSE utilizes the lines arranged for communication with the memory device to obtain the resistive values of the one or more resistive element thereby decoding additional configuration information.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description and which are not in the prior art.

I claim:

1. The apparatus for remote configuration identification comprising:
   a first electrical path for connection to a first resistive element;
   a second electrical path for connection to at least one of a second resistive element, a multi-bit storage device and an open connection, said second electrical path different from said first electrical path, said second resistive element different from said first resistive element;
   a means for identifying a value of the first resistive element; and
   a control circuitry,
   said control circuitry being operative to:
      identify, via said means for identifying and said first electrical path, a value associated with the first resistive element, and in the event said identified value is indicative that the multi-bit storage device is connected to said second electrical path, obtain first configuration information from the multi-bit storage device via said second electrical path.

2. The apparatus according to claim 1, wherein said control circuitry is further operative to obtain second configuration information from said identified value of the first resistive element.

3. The apparatus according to claim 1, wherein said control circuitry is further operative in the event said identified value is not indicative that the multi-bit storage device is connected to said second electrical path, to obtain second configuration information from said identified value of the first resistive element.

4. The apparatus according to claim 1, wherein said control circuitry is further operative in the event said identified value associated with the first resistive element is not indicative that the multi-bit storage device is connected to said second electrical path, to identify, via said means for identifying, a value associated with the at least one second resistive element connected to said second electrical path.

5. The apparatus according to claim 4, wherein said control circuitry is further operative to obtain second configuration information from said identified value associated with the at least one second resistive element.

6. The apparatus according to claim 1, wherein said means for identifying comprises at least one of a current source, an analog multiplexer and an analog to digital converter.

7. The apparatus according to claim 1, wherein said first configuration information comprises information regarding arrangement according to at least one of data pair powering, spare pair powering and a combination of data pair powering and spare pair powering.

8. The apparatus according to claim 1, wherein said first configuration information comprises information regarding a type of display.

9. The apparatus according to claim 1, wherein said first configuration information comprises vendor specific configuration information.

10. The apparatus according to claim 9, wherein said vendor specific configuration information comprises one of a preferred method of reducing power in the event of a failure of one or more components of a power source, a priority of powering, a size of the apparatus, and an identification of a master port of the apparatus.

11. The apparatus according to claim 1, wherein the apparatus is a power sourcing device for use with a power ready patch panel.

12. The method of remote identification comprising:
providing a first electrical path for connection to a first resistive element;
providing a second electrical path for connection to at least one of a second resistive element, a multi-bit storage device and an open connection, said provided second electrical path different from said provided first electrical path, said second resistive element different from said first resistive element;
identifying, via said provided first electrical path, a value associated with the first resistive element; and
in the event said identified value is indicative that the multi-bit storage device is connected to said second electrical path, obtaining, via said provided second electrical path, first configuration information from the multi-bit storage device.

13. The method according to claim 12, further comprising obtaining second configuration information from said identified value of the first resistive element.

14. The method according to claim 12, further comprising in the event said identified value is not indicative that the multi-bit storage device is connected to said second electrical path, obtaining second configuration information from said identified value of the first resistive element.

15. The method according to claim 14, further comprising in the event said identified value associated with the first resistive element is not indicative that the multi-bit storage device is connected to said second electrical path, identifying a value associated with the at least one second resistive element connected to said provided second electrical path.

16. The method according to claim 15, further comprising obtaining third configuration information from said identified value associated with the at least one second resistive element.

17. The method according to claim 12, further comprising in the event said identified value is not indicative that the multi-bit storage device is connected to said second electrical path, identifying a value associated with the at least one second resistive element connected to said second electrical path, and obtaining second configuration information from said identified value associated with at least one second resistive element.

18. The method according to claim 12, wherein said configuration information comprises information regarding arrangement according to at least one of data pair powering, spare pair powering and a combination of data pair powering and spare pair powering.

19. The method according to claim 12, wherein said configuration information comprises information regarding a type of display.

20. The method according to claim 12, wherein said configuration information comprises vendor specific configuration information.

21. The method according to claim 20, wherein said vendor specific configuration information includes one of a preferred method of reducing power in the event of a failure of one or more components of a power source, a priority of powering, a size, and an identification of a master port.

22. The system for remote identification comprising:
a power sourcing device;
a power ready patch panel comprising a first resistive element and at least one of a second resistive element, a multi-bit storage device and an open connection;
a first electrical path between said power sourcing device and said first resistive element; and
a second electrical path between said power sourcing device and said at least one of a second resistive element, a multi-bit storage device and an open connection;
said power sourcing device being operable to obtain a value associated with said first resistive element via said first electrical path, and
in the event said obtained value is indicative that a multi-bit storage device is connected to said second electrical path, obtain configuration information from said multi-bit storage device via said second electrical path.

23. The system for remote identification according to claim 22, wherein said power sourcing device is further operable in the event said obtained value is not indicative that the multi-bit storage device is connected to said second electrical path, to obtain configuration information from at least one of said first resistive element via said first electrical path, said at least one second resistive element via said second electrical path and said open connection via said second electrical path.

24. The system for remote identification according to claim 22, further comprising a third electrical path between said power sourcing device and said power ready patch panel, wherein said power sourcing device is further operable responsive to said obtained configuration information to supply a current limited power to said power ready patch panel via said third electrical path.

25. The system according to claim 22, further comprising a third electrical path between said power sourcing device and said power ready patch panel and wherein said power ready patch panel further comprises a display, said power sourcing device being further operable to send compatible information via said third electrical path to said display responsive to said obtained configuration information.

26. The system according to claim 22, further comprising a third electrical path between said power sourcing device and said power ready patch panel and wherein said power ready patch panel further comprises a display, said power sourcing device being further operable to drive said display via said third electrical path responsive to said obtained configuration information.

27. The system according to claim 22, wherein said configuration information comprises information regarding arrangement according to at least one of data pair powering, spare pair powering and a combination of data pair powering and spare pair powering.

28. The system according to claim 22, wherein said configuration information comprises vendor specific configuration information.

29. The system according to claim 28, wherein said vendor specific configuration information comprises one of a preferred method of reducing power in the event of a failure of one or more components of a power source, a priority of powering, a size of said power ready patch panel, and an identification of a master port of said power ready patch panel.

* * * * *

UNITED STATES PATENT AND TRADEMARK OFFICE
CERTIFICATE OF CORRECTION

PATENT NO. : 7,500,121 B2  Page 1 of 1
APPLICATION NO. : 11/261706
DATED : March 3, 2009
INVENTOR(S) : Tamir Langer It is certified that error appears in the above-identified patent and that said Letters Patent is hereby corrected as shown below:

Col. 12, line 23; Claim 1 - should read - "An" apparatus for remote configuration identification Col. 13, line 21; Claim 12 - should read - "A" method of remote identification comprising:

Col. 14, line 15; Claim 22 - should read - "A" system for remote identification comprising:

Signed and Sealed this

Twenty-sixth Day of May, 2009

JOHN DOLL
*Acting Director of the United States Patent and Trademark Office*